United States Patent
Olmsted et al.

[15] 3,660,021
[45] May 2, 1972

[54] PREPARATION OF FINELY DIVIDED CALCIUM SILICATE

[72] Inventors: Lester E. Olmsted, Affton; Eckard J. Puetz, Lemay; Warren Rodgers, St. Louis; Charles R. Trampier, Jr., Webster Groves, all of Mo.

[73] Assignee: N L Industries, Inc., New York, N.Y.

[22] Filed: Sept. 29, 1970

[21] Appl. No.: 76,584

[52] U.S. Cl. ..............................23/110 R, 23/121, 23/122
[51] Int. Cl. .....................................C01b 33/24, C01d 5/00
[58] Field of Search .........................23/110, 110.1, 122, 121

[56] References Cited

UNITED STATES PATENTS

| | | |
|---|---|---|
| 2,278,590 | 4/1942 | Ruthruff............................23/110 R X |
| 2,739,068 | 3/1956 | Eichmeier.........................23/110 R X |
| 2,980,644 | 4/1961 | Atkinson...........................23/110 R X |
| 2,888,322 | 5/1959 | Podschus..............................23/110 R |
| 2,241,791 | 5/1941 | Rembert................................23/110 R |
| 2,956,859 | 10/1960 | Rodgers et al............................23/122 |

Primary Examiner—Edward Stern
Attorney—Robert L. Lehman, Fred Floersheimer, Harold L. Gammons and Robert L. Holiday

[57] ABSTRACT

A new type of finely divided calcium silicate has been produced by reacting calcium sulfate with sodium silicate an amounts to form theoretically a composition containing from about 0.7 to about 4.0 moles of $SiO_2$ for each mole of CaO. The by-product sodium sulfate is removed from the calcium silicate by washing.

5 Claims, No Drawings

PREPARATION OF FINELY DIVIDED CALCIUM SILICATE

BACKGROUND OF THE INVENTION

Many prior art silicate materials have been described in the prior art. Among those described are naturally occuring alkali and alkaline earth metal silicates which have been thoroughly ground. In addition sodium, aluminum and calcium silicate materials have been prepared by a variety of methods including the reaction of sodium silicate with calcium chloride.

SUMMARY OF THE INVENTION

A new type of finely divided hydrated calcium silicate has been prepared which contains from about 0.7 mole to about 4.0 moles of $SiO_2$ for each mole of CaO.

This new product has the following properties:

| | |
|---|---|
| Oil Absorption | 100–250 |
| Tinting Strength | 100–250 |
| Loss of Ignition(%) | 14–20 |

The product is produced by reacting calcium sulfate with sodium silicate. The amount of sodium silicate used in the reaction between sodium silicate and calcium sulfate is from 0.8 to 1.2 moles of sodium silicate for each mole of calcium sulfate. The amount of $SiO_2$ present in the sodium silicate used is from 0.7 mole to 4.0 mole for each mole of $Na_2O$. The calcium silicate produced therefore has substantially the same mole ratio of CaO to $SiO_2$ as the $Na_2O$ to $SiO_2$ mole ratio used in the sodium silicate employed.

DESCRIPTION OF THE PREFERRED EMBODIMENT

Before describing in detail the process and the product of the instant invention, the following test procedures were used to determine the oil absorptions and tinting strengths of the products produced.

The oil absorption was determined by the standard ASTM - D281-31 test.

The tinting strength was determined by the calcium silicate Tint Test for Latex Emulsion Paints which is described as follows:

19.8 grams of calcium silicate are added with rapid agitation to 102.4 grams of a standard silicate pigment latex paint composition tinted with carbon black to form a gray paint composition. The tinting strength is measured by comparing the green reflectance value measured on a Colormaster with the green reflectance values of a standard silicate pigment.

The product of the instant invention is prepared by reacting a certain type of calcium sulfate with sodium silicate. The calcium sulfate used in the instant invention may be prepared, for example, from a finely ground limestone. Two particular methods for preparing a calcium sulfate in the form of gypsum are described in U.S. Pat. No. 2,822,242 and U.S. Pat. No. 2,956,859. If desired the gypsum formed also may be converted to anhydrite before using.

In order to prepare the hydrated calcium silicate composition of the instant invention, the finely ground gypsum or anhydrite is mixed with water to form a slurry containing from 20 to 200 gpl. gypsum.

To this slurry, with agitation, is added to sodium silicate solution. This sodium silicate solution contains from 0.7 to 4.0 moles of $SiO_2$ for each mole of $Na_2O$ and the concentration of the sodium silicate solution is from 40 to 190 gpl. calculated as $SiO_2$. The total amount of sodium silicate added to the calcium sulfate is from 0.8 mole to 1.2 moles of sodium silicate for each mole of calcium sulfate. The reaction is carried out with agitation at a temperature between room temperature and 90° C. After a 1 or 2 hour cure, if desired, the hydrated calcium silicate produced is washed well with water to remove the sodium sulfate formed as a by-product. The washed hydrated calcium silicate produced is dried and milled.

When the sodium silicate solution is added to the gypsum slurry, it has been found that the gypsum slurry should be diluted to below 60 gpl. $CaSO_4$ before adding the sodium silicate solution if only moderate speed agitation is used. With rapid agitation the gypsum slurry may be somewhat above 60 gpl. $CaSO_4$.

The sodium silicate solution and the gypsum slurry may also be added simultaneously to a reaction tank provided the mixture is rapidly agitated and the concentration of the sodium silicate solution is held above 80 gpl. $SiO_2$.

In order to explain more fully the instant invention, the following examples are presented:

EXAMPLE 1

The gypsum in this example was prepared using the process described in U.S. Pat. No. 2,822,242. The gypsum was uniform in size and had high purity.

Two hundred and seventy-six grams of gypsum, calculated as $CaSO_4$ on a dry basis, were slurried in water to produce 6 liters slurry.

To this slurry were added 4.8 liters of a diluted "N" Brand solution (92 gpl. $SiO_2$) containing $Na_2O·3.33\ SiO_2$, which is equivalent to 9 percent excess to react with the $CaSO_4$ present in the slurry to form $CaO·3.33\ SiO_2$ and sodium sulfate.

The sodium silicate solution was added to the gypsum slurry at the rate of 133 ml./minute over a period of 36 minutes while the slurry was agitated rapidly. The mixture was then agitated for an additional 60 minutes after the sodium silicate solution had all been added. The temperature was held at room temperature during the addition and holding periods. After the 60 minutes holding period the mixture was filtered, washed with three volumes of demineralized water, (heated to 60° C.) for each volume of slurry.

The calcium silicate formed was then dried and milled thoroughly. The calcium silicate formed possessed the following properties:

| | |
|---|---|
| Oil Absorption | 150 |
| Tinting Strength | 165 |
| Loss on Ignition(%) | 16 |

EXAMPLES 2 – 3

In these examples the gypsum slurry and the sodium silicate solutions were added simultaneously into a tank where the mixture was rapidly agitated and the reaction took place substantially immediately. The silicate content was varied from 92 to 184 gpl. $SiO_2$ while the gypsum content in the slurry was varied from 50 to 200 gpl. In all cases the reaction mixture was cured for 60 minutes to form agglomerates of sufficient size to product a product which deliquored and washed readily. The details of these runs are recorded in the Table along with those of Example 1.

EXAMPLES 4 – 5

Using the procedure described in Example 1, the silicate solution was added to the gypsum slurry; however the gypsum slurry was diluted to 25 to 50 gpl. $CaSO_4$ before the sodium silicate was added. In these examples only moderate agitation was used instead of rapid agitation. The details of the runs and the results obtained are also recorded in the Table.

TABLE

| Example | 1 | 2 | 3 |
|---|---|---|---|
| | Sodium silicate solution added to gypsum slurry. Rapid agitation | Sodium silicate and gypsum slurry added simultaneously. Rapid agitation | Sodium silicate and gypsum slurry added simultaneously. Rapid agitation |

| | | | |
|---|---|---|---|
| $Na_2O \cdot 3.33$ $SiO_2$ Solution Volume, liters | 4.8 | 2.19 | 4.38 |
| gpl. $SiO_2$ | 92 | 184 | 92. |
| Gypsum Slurry Volume, liters | 6.0 | 5.0 | 1.26 |
| gpl. $CaSO_4$ | 46 | 50 | 200 |
| Properties Oil Absorption | 150 | 165 | 160 |
| Loss on Ignition,% | 16 | 16.6 | 16.1 |
| Tinting Strength | 165 | 155 | 155 |

| Example | 4 | 5 |
|---|---|---|
| | Sodium silicate solution added to gypsum slurry. Moderate agitation | Sodium silicate solution added to gypsum slurry. Moderate agitation |
| $Na_2O \cdot 3.33$ $SiO_2$ Solution Volume, liters | 5.28 | 5.28 |
| gpl. $SiO_2$ | 92 | 92 |
| Gypsum Slurry Volume, liters | 12 | 6 |
| gpl. $CaSO_4$ | 25 | 50 |
| Properties Oil Absorption | 139 | 137 |
| Loss on Ignition,% | 17.2 | 15.6 |
| Tinting Strength | 200 | 105 |

The hydrated calcium silicate compositions produced by the instant invention are useful as extenders in the paper and paint industries. They are particularly useful when used in conjunction with $TiO_2$ pigments. The following example is presented to show the effectiveness of their use as an extender when admixed with $TiO_2$ pigment.

EXAMPLE 6

In this example the hydrated calcium silicate was prepared in the same manner as Example 1, except that the washed hydrated calcium silicate produced was not dried and milled. Instead the washed filter cake weighing 1,333 g. and containing 18 percent hydrated calcium silicate ($CaO \cdot 3.33\ SiO_2$) was slurried with 1,667 g. $H_2O$ to obtain an 8 percent slurry. To this slurry was added a slurry of 560 g. $TiO_2$ anatase pigment which has been slurried in 250 g. distilled water. After thoroughly mixing, the slurry was deliquored, dried and milled. The milled composite mixture contained 70% $TiO_2$, 6 percent volatile matter and the remainder calcium silicate.

This composite mixture was evaluated in 5 percent pigmented paper hand-sheets and compared with a paper hand-sheet containing 100% $TiO_2$ as the pigment instead of the composite pigment containing only 70% $TiO_2$.

The opacities of the papers are recorded as follows:

| Pigmented (5%) | Opacity |
|---|---|
| 100% $TiO_2$ | 85% |
| (70% $TiO_2$ (30% hydrated (calcium silicate | 85% |

This hydrated calcium silicate composition is also useful as an added stabilizer in a latex paint which employs a $TiO_2$-anhydrite composite pigment composition as the opacifier in the paint system. The hydrated calcium silicate composition should be added to the composite pigment in amount from 3 to 10 percent and the mixture should be milled together before adding it to the paint system.

While this invention has been described and illustrated by the examples shown, it is not intended to be strictly limited thereto, and other variations and modifications may be employed within the scope of the following claims.

We claim
1. A method of preparing a finely divided hydrated calcium silicate as a new composition of matter which comprises:
   a. reacting at a temperature between room temperature and 90° C an aqueous solution of sodium silicate with an aqueous slurry of finely divided calcium sulfate containing 20 to 200 gpl of said calcium sulfate, to form sodium sulfate and a hydrated calcium silicate consisting essentially of 3.33 moles of $SiO_2$ for each mole of calcium oxide, the amounts of sodium silicate and calcium sulfate employed being from 0.8 to 1.2 moles of sodium silicate for each mole of calcium sulfate, the proportion of sodium oxide present in said sodium silicate employed being 1 mole for essentially 3.33 moles of silicon dioxide in said compound;
   b. curing the hydrated calcium silicate produced in the mixture;
   c. filtering the mixture;
   d. removing the sodium sulfate formed by washing same from said hydrated calcium silicate;
   e. drying and milling said hydrated calcium silicate and recovering said hydrated calcium silicate product having the following properties: a loss on ignition of 14 – 20 percent, oil absorption of 100 to 250, and a tinting strength of 100–250.
2. Method according to claim 1 in which the calcium sulfate in said aqueous slurry is a gypsum slurry.
3. Method according to claim 1 in which the sodium silicate solution is added to the gypsum slurry with moderate agitation and the gypsum slurry possesses a concentration of less than 60 gpl. $CaSO_4$.
4. Method according to claim 1 in which the sodium silicate solution and the gypsum slurry are added simultaneously to form a reaction mixture, said mixture being rapidly agitated during the addition period and said sodium silicate solution having a concentration above 80 gpl. $SiO_2$.
5. The composition as produced by the process of claim 1.

* * * * *